Figure 1:
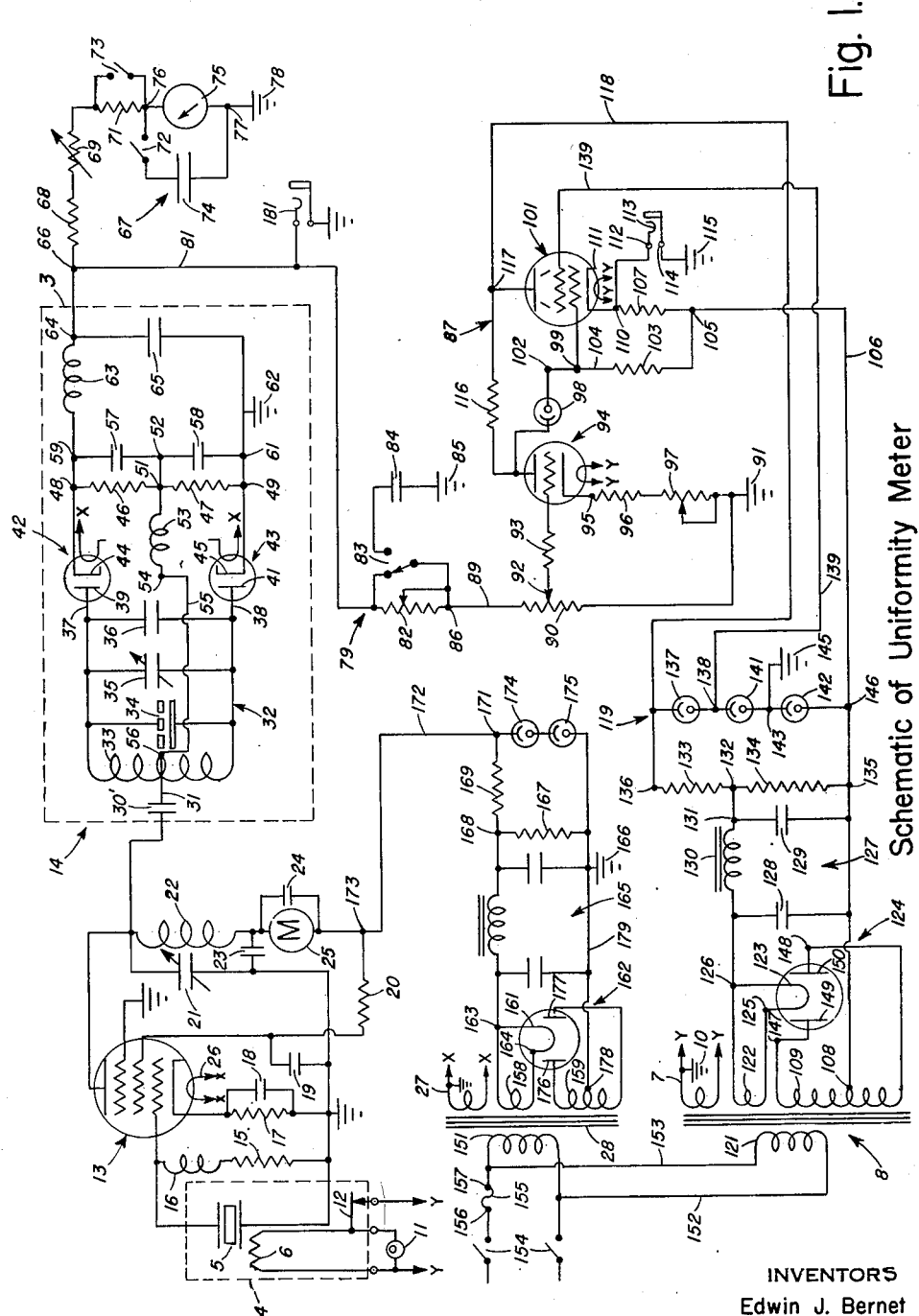

Nov. 27, 1951     E. J. BERNET ET AL     2,576,772
UNIFORMITY METER

Filed Feb. 23, 1949                 2 SHEETS—SHEET 1

INVENTORS
Edwin J. Bernet
BY   Edwin C. Hutter
Donald F. McCarthy
ATTORNEY

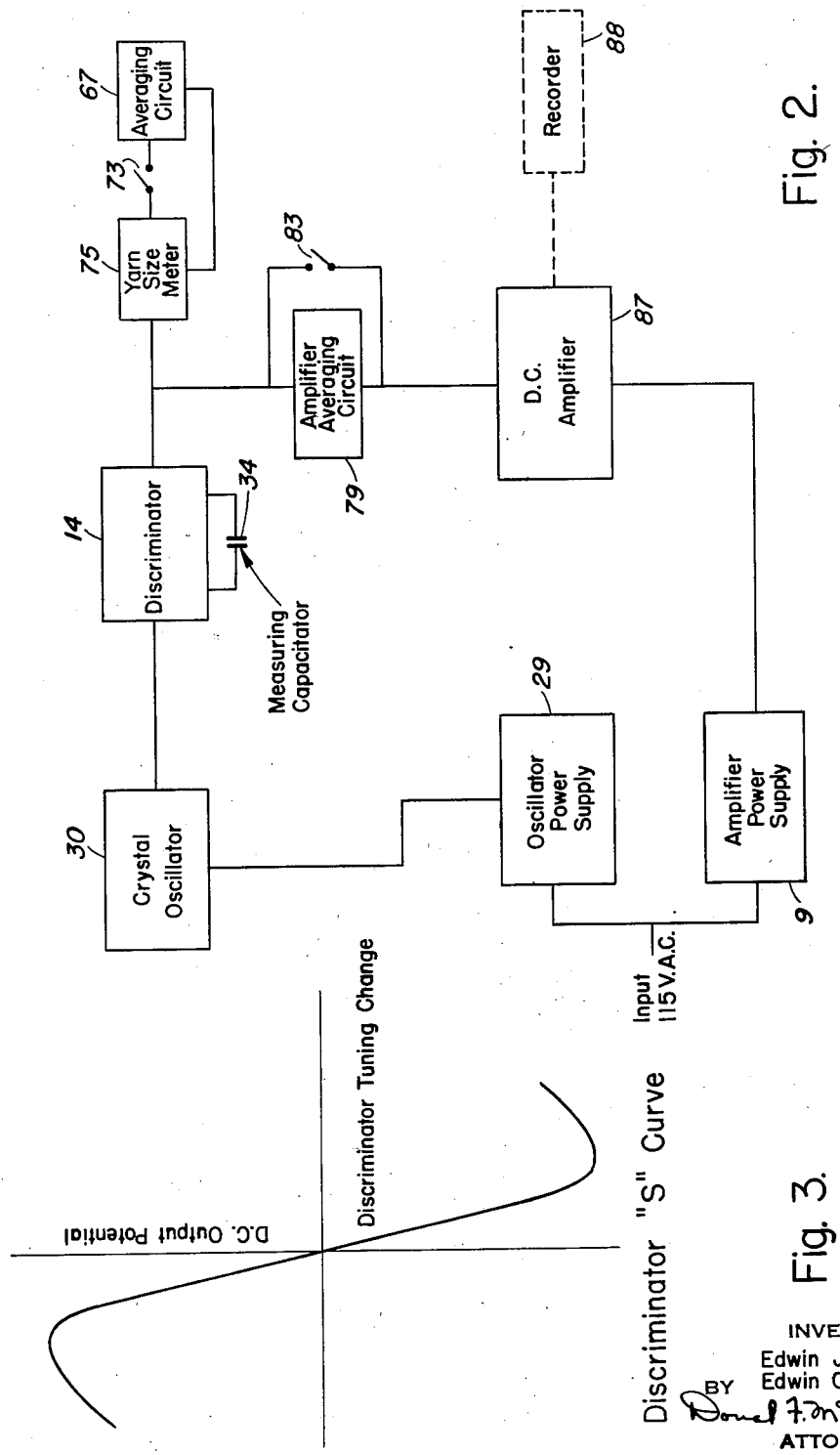

Patented Nov. 27, 1951

2,576,772

UNITED STATES PATENT OFFICE 2,576,772

UNIFORMITY METER

Edwin J. Bernet and Edwin C. Hutter, Charlottesville, Va., assignors to Institute of Textile Technology Application February 23, 1949, Serial No. 77,744

5 Claims. (Cl. 175—183)

This invention relates to the testing of materials, and more particularly to a novel meter for measuring the uniformity or evenness of materials in the form of yarn, roving, sliver or picker lap and making a permanent record thereof.

An important object of this invention is the provision of a meter for measuring the uniformity or evenness of materials in the form of yarn, roving, sliver or picker lap characterized by its simplicity of construction, inexpensiveness of manufacture and reliability and accuracy in service and by its high sensitivity and high stability.

Another object of this invention is to provide an improved uniformity meter embodying a circuit wherein change in capacity caused by variations in the amount of material passing between condenser plates is employed to change the tuning of a discriminator circuit.

A further object of this invention is to provide an improved uniformity meter having a fixed frequency oscillator and discriminator circuit wherein the material measuring condenser is in the discriminator circuit.

Still another object of this invention is the provision of an improved uniformity meter employing an oscillator, discriminator and multiple measuring condenser capable of making measurements within the range of from 0.1 to 100 count with only three condenser slots.

Other objects of this invention, together with certain details of construction and combinations of parts, will appear from the following description.

Some instruments heretofore employed for the testing of the uniformity or evenness of textile materials were not flexible enough to measure the uniformity or evenness characteristics of yarns, roving and slivers of either natural or artificial filaments, or a mixture thereof. Certain of the prior instruments were useful only for measuring filamentary materials in the form of yarn, while others could be used only when the materials were in the form of a roving or sliver. Where prior devices were sufficiently adaptable to be capable of measuring yarns, rovings and slivers, they then had the disadvantage of lacking a proper balance of sensitivity and stability, i. e., where they were characterized by high sensitivity, they were deficient in stability, and where they possessed high stability, they were lacking in sensitivity. Therefore, such devices were unsatisfactory for full evaluation of the filamentary material being tested.

The present invention provides means for accurately and conveniently measuring the uniformity of yarns, rovings and slivers, as well as picker lap and, by the use of a suitable recording device, making a permanent record thereof. The device of the present invention may be suitably calibrated over a continuous range from a sliver as heavy as 0.1 Hank count to as small as 100 Hank count, and it may be used in measuring not only natural filamentary materials such as cotton, silk and wool, but also artificial filamentary materials such as rayon, nylon, Vinyon and the like.

The uniformity meter of the present invention operates on the dielectric effect, whereby changes in uniformity of filamentary material being tested passing between the two plates of an electrical condenser cause proportional changes in the capacity of the condenser. With the exception of corrections corresponding to different moisture contents in various materials tested or differences in sizes or finishes of the material or to geometric distortion of a non-homogeneous electric field, the capacity of the measuring condenser is proportional to the mass or weight and the dielectric properties of the material between the condenser plates. Since the mere physical dimensions of the material are not measured in use of the inventive device, the instrument is insensitive to characteristics of the material such as its twist or compactness. Since the material being tested is not touched during measurement other than by the feed rolls or guide eyelets, the material is not altered or destroyed. Due to the fact that the measurement is made electrically and is translated into signals which can be recorded on a high speed pen motor-type recorder, such as the Brush recorder marketed by the Brush Development Company of Cleveland, Ohio, substantially the only limitation on the speeds at which materials may be tested is the rate at which the material can be run. Roving and sliver are generally run at speeds of 3 inches or 6 inches per second so that drafting does not occur. Yarns are run at 2 to 10 feet per second, but they may be run successfully at a speed as high as 50 feet per second. Picker lap must be run at a slower speed, and approximately six inches per second has been found to give satisfactory results.

The uniformity meter of the present invention permits evaluation or grading of yarns, rovings, slivers and picker lap by a device which may be calibrated and operated to give a record of the uniformity characteristics of the tested material which is substantially independent of the human element. Moreover, the uniformity meter may be employed not only for testing but also may be used in conjunction with a textile machine control device, as well as with a recording device. For example, in textile apparatus where a roving is processed from a sliver, the uniformity meter could be used to measure the outcoming roving and cause a suitable control device to change the draft ratio to produce a more uniform roving from which a more uniform yarn may be made.

By careful examination or analysis of the record graph obtained by the use of the uniformity meter of the instant invention, it is possible to pick out drafting waves of various wave lengths and amplitudes in the material being tested and with this data it is possible to deduce the cause of product defects, whether it be in the sliver stage, the roving stage or the final spinning. Thus, a periodicity in yarn caused by a flat on the final roller of the spinning frame will give a wave about 3 inches in length, whereas a wave a hundred or more times this length would probably be due to a periodicity in the sliver.

By adjustment of the speed at which the material is run, and of the recorder chart speed, graphs may be obtained in the range from one to one correspondence (i. e. one inch of yarn, roving, sliver or picker lap tested equals one inch on the record graph) up to approximately 600 to one (i. e. 50 feet of material equals one inch on the record graph). Various recording speeds may be used for showing different effects. In addition, the electrical averaging circuit employed in the preferred embodiment of this invention, when brought into operation introduces an adjustable degree of damping whereby the recording graph avoids rapid fluctuations due to nonuniformities recurring within short yarn lengths and merely compares the material yard by yard. Longer drafting waves are thus made more apparent.

In the preferred embodiment of this invention, the calibration in continuous range from 0.1 to 100 Hank count is achieved by dividing the total range into three subranges and using a measuring condenser having three different sized slots or by using detachable individual measuring condensers of different ranges. The smallest is designed to accommodate yarn from 10's to 100's, and nominal count may be read directly from the calibrated scale of the size meter. The intermediate range is designed to accommodate heavy yarns and light rovings from 1's to 10's, and the nominal count may be determined by reading the same size meter scale and dividing this reading by 10. The largest is designed to receive slivers and heavy rovings in the range of from 0.1's to 1's, and the nominal count is determined by reading the identical size meter scale and dividing the reading by 100. Because of the size and nature of picker lap, a special measuring condenser head must be used to accommodate it, but the principle of operation of the discriminator remains unchanged. A jack may be provided so that measuring condensers of different ranges of measurement can be quickly and conveniently interchanged and connected to the discriminator circuit. With high yarn speeds, the size meter will fluctuate rapidly over rather wide limits. To aid in a rough check of nominal size, a switch is provided to connect electrical damping means into the circuit to damp the indicator vibrations of the size meter and gives a more steady reading.

In the preferred embodiment of this invention, the foregoing advantages are achieved by the use of a measuring meter in a novel circuit including a modification of the conventional phase shift type of frequency modulation sensitive discriminator circuit. A constant frequency signal is supplied to the input of this discriminator circuit at a radio frequency of 7.5 megacycles for yarn, roving and sliver, or 4.5 megacycles for picker lap by a piezo-electrically controlled oscillator and the discriminator output is a D. C. potential which varies in an S curve with changes in the resonant frequency of the discriminator tuning circuit. The measuring condensers for testing the uniformity of the yarn, roving or sliver are connected in portions of the discriminator circuit that determine its fundamental resonance so as to change the tuning thereof. When the material being tested is introduced between the plates of one of the measuring condensers, the capacity of that condenser is increased. This changes the tuning of the discriminator circuit and the result is an initial D. C. reference potential appearing at the output of the discriminator, proportional in magnitude to the amount of material introduced. As the material under test is run continuously through the condenser, the output of the discriminator is a D. C. potential varying relative to the initial reference potential in proportion to changes in the mass of the material between the condenser plates.

The discriminator circuit per se is characterized by two novel features, to wit, (1) by a reduction in inductive input in favor of capacitive input and by using a coil with very high "Q," the steepness of the output S curve is increased, and (2) instead of feeding the discriminator input circuit with 5 to 10 volts radio frequency signal, as is usually common in frequency modulation radio communication receivers, said discriminator circuit is fed with substantially higher voltage, for example, 400 peak to peak volts. The present oscillator-discriminator circuit under these conditions gives an output change of 1 volt D. C. for a capacity change in the testing condenser of approximately $1 \times 10^{-15}$ farads.

The oscillator-discriminator circuit of the present invention produces a signal which is applied both to a visual indicator, the calibrated size meter and also to a D. C. amplifier which may be used to drive a recording device such as a high speed pen recorder. Normally, the size meter is a 0–50 microammeter across the discriminator output with a scale reading directly in cotton count and calibrated by an adjustable series resistor. Preferably, two switches are associated with said size meter, one for damping the meter movement to produce a more steady reading and the other for decreasing the sensitivity of the meter for adjustment purposes.

The present invention will be better understood from a consideration of the following description in conjunction with the accompanying drawings which illustrate a preferred embodiment of the invention and in which Fig. 1 is a diagrammatic view of the electric circuits employed in the uniformity meter of the present invention, Fig. 2 is a functional block diagram thereof, and Fig. 3 is a view showing the characteristics of the signal produced by the discriminator circuit.

Referring now to the drawings for a detailed description of this invention, reference numeral 4 indicates generally a constant temperature chamber housing or oven for a piezo-electric crystal 5 which provides that the frequency of oscillation of the crystal will remain at a constant value. The heating of the oven is effected by means of an electric resistance heating element 6 controlled by a thermostat switch 12 in the leads Y—Y connecting the resistance to a winding 7 of transformer 8 of amplifier power supply 9, one side of said winding 7 being grounded at 10. In the heating circuit there may be included a pilot lamp 11 across the resistance and power supply.

The crystal 5 is connected in the control grid circuit of a pentode vacuum tube 13, which may be a 6AG7 tube. The vacuum tube 13 and its associated circuit elements constitute a conventional oscillator which serves to supply continuous radio frequency power to the input of a modified form of conventional phase-shift type of frequency modulation sensitive discriminator circuit generally indicated by reference numeral 14. Oscillator circuit elements are connected in conventional circuitry, and comprise a resistor 15 in series with a radio frequency choke 16 shunted across the circuit crystal, a resistor 17 and capacitor 18 in the cathode circuit of the vacuum tube, and a capacitor 19 and a resistor 20 in the screen-grid circuit of said tube. The suppressor-grid of the tube, it will be noted, is at ground potential. A variable capacitor 21 is grounded on one side, and the other side is connected to the anode of vacuum tube 13. One end of an inductor 22 is also connected to the anode of vacuum tube 13 and its other end to ground through capacitor 23. Plate current measuring meter 25, shunted by a capacitor 24, is connected at one end to inductor 22 and at the other to the anode or plate current supply of the power pack as will hereinafter be described. Leads X—X of the heater 26 of vacuum tube 13 are connected to a winding 27 of a transformer 28 of the oscillator power supply 29. The above-described crystal controlled oscillator is indicated in Fig. 2 by reference numeral 30. As will be apparent to those familiar with radio circuitry, the oscillator output is tapped from the plate circuit of the vacuum tube 13, and for maximum efficiency of operation the oscillator tank circuit comprised of the inductor 22 and the capacitors 21 and 23 which are shunted across this inductor, is peaked to substantially the same resonant frequency as the frequency of the crystal 5. This can be easily accomplished by adjustment of the variable capacitor 21 while reading the oscillator plate current meter 25 so that the capacitor can be varied until maximum plate current is drawn, by this means the maximum output is obtained from the oscillator.

The discriminator circuit 14 constituting a portion of the device according to this invention is essentially a modified form of the familiar Foster-Seeley frequency discriminator and its input is connected to the source of radio frequency power from the oscillator 30 through a coupling capacitor 30', the terminal 31 of which is connected to the frequency discrimination inductor circuit generally indicated by reference numeral 32. This circuit comprises a center-tapped inductor 33 across the terminals 37 and 38 of which are connected in parallel the elements of a measuring capacitor 34, an adjustable capacitor 35, and a fixed capacitor 36, and which are applied to plates or anodes 39 and 41 of a pair of diode type rectifiers 42 and 43, which may be in a common envelope such as the duodiode 6AL5 type of tube. The cathodes 44 and 45 of the said vacuum tubes or dual function tube are connected across series-connected resistors 46 and 47 at the terminals 48 and 49, and the common or midpoint connection 51 of the resistors 46 and 47 is connected through radio frequency choke 53, terminal 54, and lead 55 to the center tap 56 of the inductor 33. Capacitors 57 and 58 are connected in series between terminals 59 and 61, and at their midpoint or common terminal 52 to the middle terminal 51 of the resistors 46 and 47. The cathode line connected with terminal 61 is grounded as indicated at 62 and is connected to a radio frequency choke 63 through a fixed capacitor 65 and a terminal 64, and circuit is completed through the choke to the other cathode line connected with terminal 59. The discriminator output can, of course, be sensed from the terminal 64 when measured against ground potential.

The oscillator discriminator circuit above described has two particularly noticeable features to which attention is directed: first, the inductive component of the discriminator tuned circuit is minimized in favor of the capacitive component and inductor 33 is characterized by having a high value of "Q", i. e. a high inductive reactance and low resistance, so that, as shown in Fig. 3, the steepness of the S curve is increased. Secondly, instead of feeding the discriminator input circuit with a signal of merely 5 to 10 volts radio frequency signal, as is common in frequency modulation radio communication receivers, the present discriminator circuit is fed with a signal at a potential of approximately 400 peak to peak radio frequency volts, and it will be understood that to this end inductor 33 is so constructed as to experience the necessary potential differences. The oscillator-discriminator circuit of the present invention under these conditions gives an output signal change of 1 volt D. C. for a capacity change of $1 \times 10^{-15}$ farads in the measuring condensers 34.

The output of the oscillator-discriminator circuit is fed from terminal 64 through the shielded housing 3 to terminal 66 in the metering circuit generally indicated by reference numeral 67, said metering circuit comprising in series, a resistor 68, a variable resistor 69, a resistor 71 with a shorting switch 73 and a switch 72 in series with a capacitor 74 across a yarn size meter 75. The meter 75 is connected in the circuit between terminals 76 and 77, the latter terminal being the common junction of capacitor 74, meter 75 and ground 78. The meter 75 is a 0–50 microammeter provided with a scale calibrated in count units with a zero adjustment provided by variable resistor 69. The switch 72 connects the condenser 74 in shunt across the meter, damping its movement to produce a more steady reading, and the switch 73 short-circuits the resistor 71 and decreases the sensitivity of the meter for adjustment purposes.

The oscillator-discriminator circuit output also feeds an amplifier averaging circuit 79 through a lead 81 connected to terminal 66. The averaging circuit, which is constituted by a variable resistor 82, and a single-pole double-throw switch 83 for connecting into circuit a capacitor 84 connected to ground 85, functions to smooth out instantaneous variations of the output current from the discriminator circuit before amplification.

The averaging circuit 79 is connected by a lead 89 to a two-stage D. C. amplifier generally indicated by reference numeral 87, which is designed to produce a distortion-free output signal having sufficient power to drive a Brush pen recorder 88 (Fig. 2) or similar recording means which will respond to frequencies up to 100 cycles per second, or more. Thus the lead 89 connects terminal 86 of the averaging circuit to a potentiometer 90 the other end of which is grounded at 91. The wiper 92 of the potentiometer 90 is connected through a series resistor 93 to the grid of a triode 94, which may be a 6J5 type tube, having its cathode 95 connected through resistor 96 and, in series therewith, variable resistor 97, to ground potential. Variable resistor 97 is provided to adjust the initial position of the recorder pen when a pen recorder is used with the amplifier as will be subsequently described.

The output signal from the plate circuit of vacuum tube 94 is applied through a protective voltage controlling gas discharge tube 98, which may be a VR75 tube, to the terminals 102 and 99 connected in circuit to the control grid of a tetrode 101. This tube, which may be a beam power amplifier of the 6V6 type, is connected in a cathode-follower type circuit, including a resistor 103 linking the control grid and the cathode voltage supply at its point of connection to the cathode load resistor 107, which derives its voltage through a lead 106 connected to the center tap 108 of a high voltage secondary winding 109 of power transformer 8.

A terminal 110 of the cathode load resistor 107, which is connected to the cathode 111 of the vacuum tube 101, is also connected to a terminal 112 of a jack 113, the other terminal 114 of said jack being grounded at 115, for connection to a recorder 88 which is employed in the measuring instrument of the present invention.

The plate voltage of tube 101 is obtained from the power supply through lead 118 which also supplies the plate circuit of tube 94 through resistor 116. The filament voltages of said tubes are supplied from the power leads Y—Y.

The amplifier power supply will now be described. To a terminal 117 in the plate circuit of tube 101 is connected a lead 118 which terminates at the positive side of a rectified, smoothed and voltage-stabilized high voltage power supply, generally indicated by reference numeral 119, and comprising the transformer 8 having a primary winding 121, a filament winding 122, the center-tapped high voltage winding 109 and the winding 7. Winding 122 is connected to the filament 123 of a full-wave rectifier 124, which may be a 5U4 tube, at terminals 125 and 126. The latter terminal 126 which is the positive side of the rectifier, is connected to the filter network 127 comprising capacitors 128 and 129 and inductor 130 connected in a conventional π network to load resistor 134 having terminals 132 and 135, the last being on line 106 constituting the cathode follower amplifier cathode voltage supply above mentioned.

Resistor 133 is connected on one end to the terminal 132 of load resistor 134 and is provided on its other end with a terminal 136 to which is connected the lead 118 of the amplifier plate circuit. A voltage-regulator type gas discharge tube 137, which may be a VR105 type tube, is also connected to line 118 and bridges to a terminal 138 which is the junction of a lead 139 from the screen grid of beam amplifier 101 and another voltage-regulator type gas discharge tube 141, which may be a VR150 type tube. A third voltage-regulator type gas discharge tube 142, which may be a VR104 type tube, is connected to a terminal 143, which is grounded at 145, and also connected to tube 141, bridges to the line 106 at the terminal 146 thereon.

The winding 109 of transformer 8 is provided with terminals 147 and 148 to which are connected respectively plates 149 and 150 of the tube 124.

The primary winding 151 of transformer 28 is connected to primary winding 121 of transformer 8 through leads 152 and 153, and is also connected to an alternating current power source through a double-pole single-throw switch 154. A fuse 155 is provided between terminals 156 and 157.

The oscillator power supply transformer 28 is provided with secondary windings 27, 158 and 159. Winding 158 is connected to the filament 161 of a full wave rectifier 162, which may be a 5Y3 type tube, at terminals 163 and 164, terminal 163 being the high potential output side and connected to a conventional filter circuit 165 one side of which is grounded at 166.

The oscillator rectified and smoothed power supply includes a load resistor 167, grounded at 166 and connected to terminal 168 on the higher potential line, and a resistor 169 which is connected to terminal 168 and, through a terminal 171, to two voltage-regulator type gas discharge tubes 174 and 175, which may be VR150 type tubes, connected in series to ground 166. Terminal 171, the positive side of the voltage regulated D. C. power supply line, is connected to the oscillator plate circuit by line 172.

Winding 159 of the transformer 28 is connected at its ends to plates 176 and 177 of the rectifier 162, and its center tap 178 is connected through lead 179 to ground 166.

The oscillator-discriminator output line may be provided with a jack 181 so that a reading in a different type of average function may be obtained, if desired, by the use of an additional circuit and meter other than those disclosed.

Any suitable mechanism may be employed for causing the material to be tested to pass through the measuring condenser. For example, yarn from a suitable source such as a textile machine or yarn package may be fed through the condenser plates by a pair of positively driven rolls, and then taken up by a spool driven by a slave motor or it may be pulled free of the driven rolls by an air aspirator nozzle.

In operation, the uniformity meter of this invention is first turned on and allowed to warm up for a period of fifteen (15) minutes. This is the approximate time required for the temperature controlled oven for the quartz crystal oscillator to reach equilibrium. Next the oscillator-discriminator is adjusted to zero reading by adjusting variable capacitor 35 until the needle of the yarn size meter 75 is at a desired reference point on the scale. If a recording is to be made, the recorder is connected to the amplifier output jack 113, the record paper drive is turned on and the resistor 97 is adjusted so that the trace of the pen upon the record is at a suitable zero or reference base line. The arm drive motor is now turned on and the yarn, while running, is put into the measuring condenser. The height or amplitude of the recording can be controlled by adjustment of the potentiometer 90.

The nominal size of the yarn may be noted by direct reading of the yarn size meter 75. If this meter is fluctuating too rapidly due to frequently recurring unevenness of the yarn, the meter may be damped by closing switch 72 which shunts a capacitor 74 across the meter. If it is desired to record an average yarn size to show long period drafting waves, the averaging circuit is used by closing switch 83 to connect the condenser 84 into circuit. Moreover, the time constant can be adjusted to permit the obtaining of an average over different lengths of yarn by altering the potential applied to condenser 84 by adjustment of the potentiometer 82. The same procedures as above are followed for measuring roving silver or picker lap except that in these instances the material being tested is manually positioned within the measuring condensers and drawn therethrough as may be desired without use of the drive motor above described.

It will be evident from the foregoing description that the apparatus according to this invention is comprised of a source of constant frequency radio energy which is applied to a device that superficially resembles a Foster-Seeley type of frequency discriminator but differs therefrom in having the measuring condenser arranged in the discriminator circuit as the capacitive component of its resonant tank circuit, and the discriminator output, taken from the load resistances across the diode cathodes, is the signal which, when amplified, and recorded, serves as an index of the quality of the material being tested.

The stability of the device is, of course, enhanced by utilization of a separate voltage-regulated power supply for the oscillator and a voltage regulated power supply for the amplifier.

The components used in the circuit for coupling the output signal source in the discriminator circuit to the amplifier input and the circuitry of the amplifier, particularly the use of a cathode follower type of circuit in the output stage, obviously contribute to the absence of distortion in the output signal, thus increasing the accuracy of the test record produced by the device.

It also would be obvious from inspection of the circuitry of this testing equipment that a relatively small change in the capacitive component of the discriminator tank circuit will upset the balance of this circuit to a very large degree, approximating at least twice the unbalance that could be produced by the same change in capacity in the tank circuit of a variable frequency oscillator if used in place of the fixed frequency oscillator here employed, and this large degree of unbalance resulting from changes of capacity in the measuring condenser of the present device, is responsible to a large measure for the high level output signal developed across the discriminator load resistances. This factor, in conjunction with the use of a high potential RF signal from the fixed frequency oscillator, obviously minimizes errors which otherwise might be introduced into the measurements made by the device, due to defects or temperatures sensitivity of the components, or due to changes in ambient operating conditions.

We claim:

1. In a telemetric testing system of the type wherein the tested material is introduced between the electrodes of an air-dielectric capacitor whereby its capacitance is modified, and the capacitor controls translating means for converting the said capacitance modifications into an electric signal having a parameter varying proportionally thereto, and means for utilizing this signal to indicate a condition and variations in the condition of the material tested, the improved translating means that comprises: a discriminator having a resonant tank circuit that is primarily capacitive including the testing capacitor and is only secondarily inductive, the inductive component of the tank circuit being a center-tapped high-Q inductance having its ends connected to the anodes of a pair of diodes and the cathodes of said diodes being connected to the ends of a center-tapped load resistor, conductively connected at its midpoint through high-frequency impedance to the center-tap of the tank inductance; a high-radio-frequency-controlled constant-frequency signal source of frequency substantially equalling the middle frequency of said tank circuit, feeding the tank circuit through the center-tap of the inductance whereby minor variations in the tank capacity result in major variations in the signal amplitude developed across the load resistors of the diodes, and means for amplifying this signal substantially without distortion to produce high intensity signals, reflecting by their magnitude the variations in the material under test.

2. A telemetric testing system that comprises an air-dielectric capacitor having a plurality of electrodes between which the material under test may be placed whereby the capacitance of the capacitor is modified, a center-tapped inductor having a high inductive reactance and low resistance, bridging said capacitor and constituting therewith a high-Q resonant circuit, a pair of diodes having their anodes individually connected to the opposite ends of said inductor and their cathodes connected to the opposite ends of a center-tapped load resistor, conductively connected at its midpoint through a high-frequency impedance to the midpoint of said inductor, a high radio-frequency signal source connected to said resonant circuit at the center-tap of the inductor, the signal from said signal source being of a controlled frequency substantially equalling the middle frequency of said resonant circuit, whereby a high voltage potential is developed across said resistor that varies in magnitude corresponding to changes in the material being tested, means for amplifying said voltage developed across the resistor to produce an output signal and means for indicating visually the magnitude of said signal.

3. A telemetric testing system as defined in claim 2 further characterized in that the means for amplifying the output signal is a cathode-follower type amplifier substantially free from distortion.

4. A telemetric testing system as defined in claim 2 further characterized in that the means for visually indicating the magnitude of the output signal is comprised of a direct reading current sensitive meter.

5. A telemetric testing system that comprises a sensing means consisting of at least one air-dielectric capacitor having electrodes between which the material under test is placed for testing purposes whereby the electric capacity of at least one of the capacitors is modified, translating means connected to this sensing means for converting the said modifications in capacity of the capacitor into an electric signal having a parameter varying proportionally thereto, said translating means comprising a discriminator which includes a resonant tank circuit consisting primarily of capacitive components, including the sensing means, and only secondarily of inductive components, the inductive components of said resonant tank comprising a center-tapped high-Q inductance; a pair of diodes having their anodes individually connected to the ends of said inductance and their cathodes connected to the ends of a center-tapped load resistor; conductive coupling means connecting the midpoint of said resistor through a high frequency impedance to the center-tap of the tank inductance; a source of high-radio-frequency signals of controlled constant frequency substantially equal to the middle frequency of said tank resonant circuit, feeding the tank circuit through the center-tap of the inductance, whereby minor variations in the capacity of the capacitive component of the resonant tank circuit result in major variations in the signal developed across the load resistors of the diodes, and a cathode-follower type amplifier for magnifying this signal substantially without distortion to produce output signals that reflect by their magnitude the variations in the material under test.

EDWIN J. BERNET.
EDWIN C. HUTTER.

REFERENCES CITED

The following references are of record in the file of this patent:

UNITED STATES PATENTS

| Number    | Name       | Date          |
|-----------|------------|---------------|
| 2,200,863 | Schuck     | May 14, 1940  |
| 2,355,088 | Lavoie     | Aug. 8, 1944  |
| 2,361,634 | Koch       | Oct. 31, 1944 |
| 2,387,496 | Cornelius  | Oct. 23, 1945 |
| 2,412,482 | Vilkomerson| Dec. 10, 1946 |
| 2,516,768 | Grobe et al.| July 25, 1950|